Dec. 21, 1937.   J. J. DILKS, JR   2,102,788
DISK FILM MOTION PICTURE
Filed Feb. 21, 1935   7 Sheets-Sheet 1
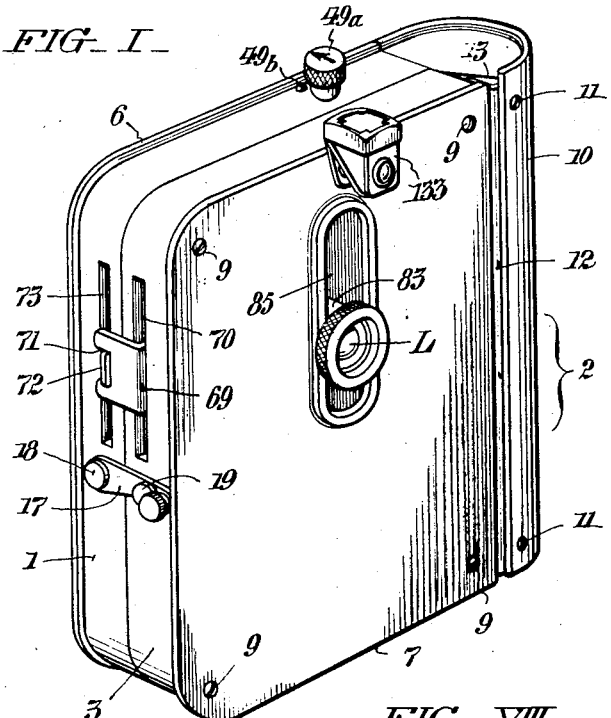
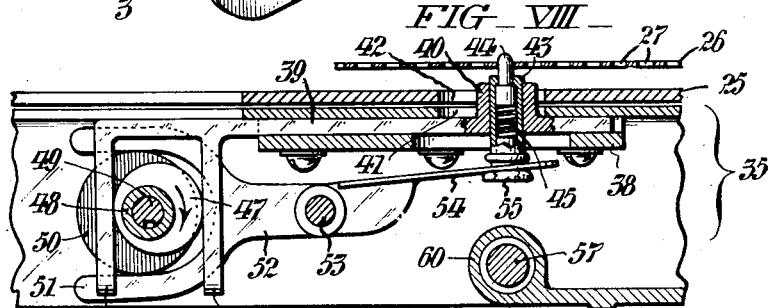
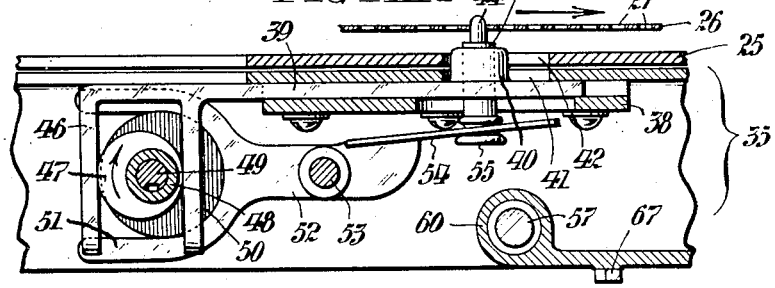
WITNESSES:   INVENTOR:
James J. Dilks, Jr.,
BY
ATTORNEYS.

Dec. 21, 1937.  J. J. DILKS, JR  2,102,788
DISK FILM MOTION PICTURE
Filed Feb. 21, 1935   7 Sheets-Sheet 2
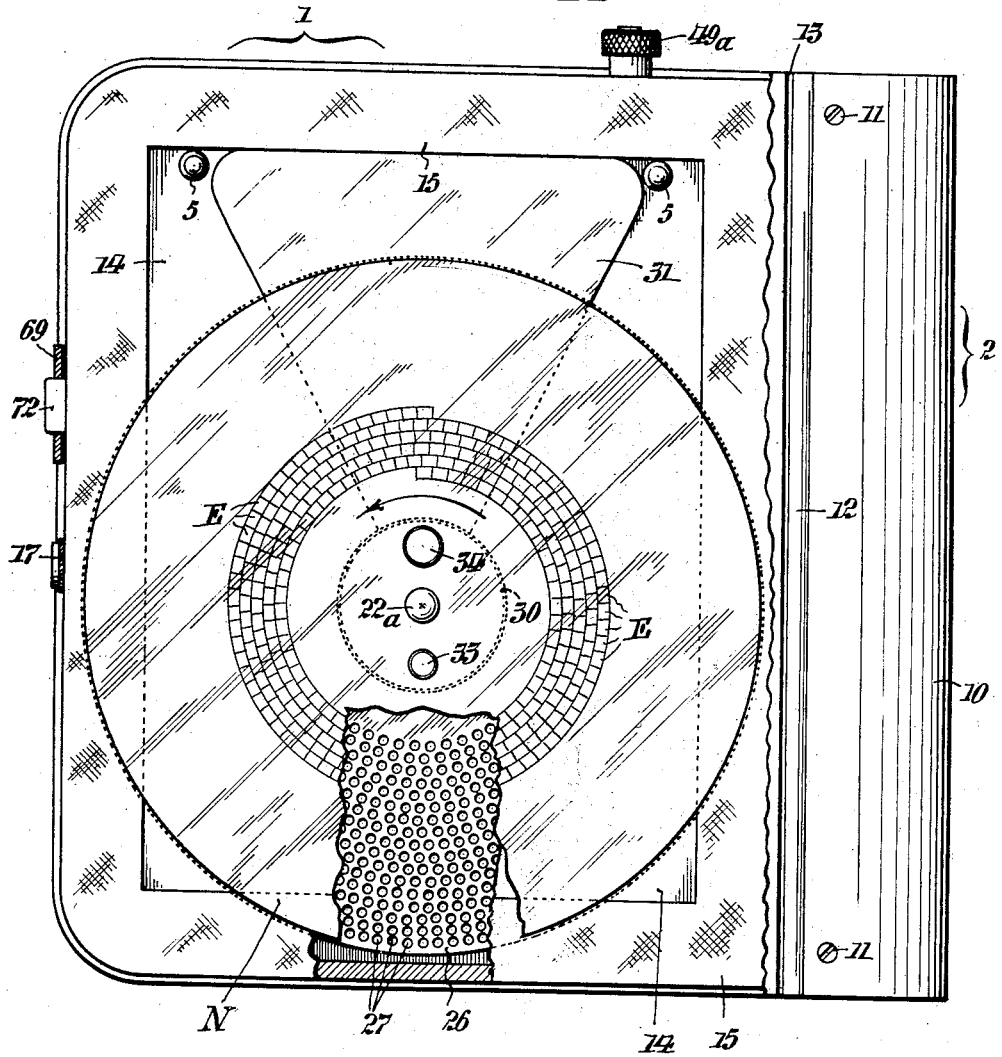

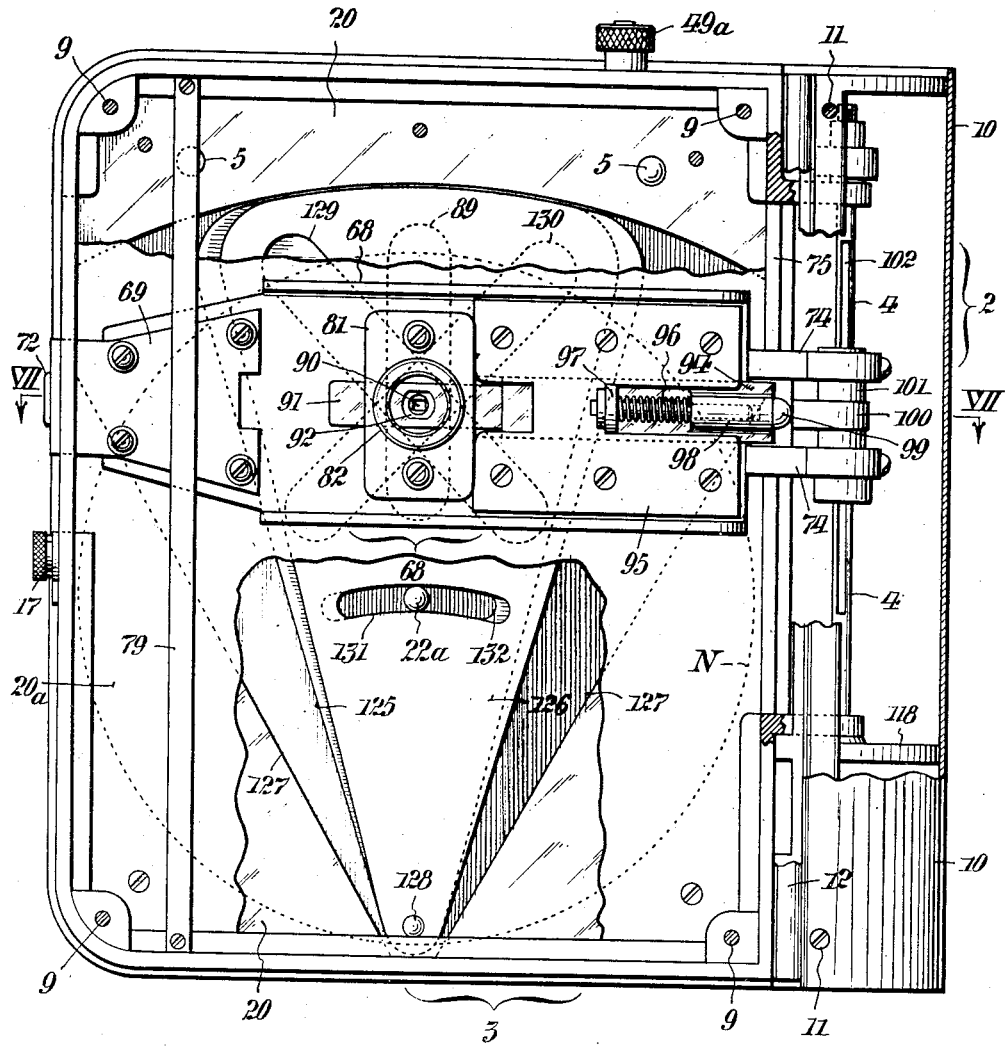

Dec. 21, 1937.　　　J. J. DILKS, JR　　　2,102,788
DISK FILM MOTION PICTURE
Filed Feb. 21, 1935　　　7 Sheets-Sheet 4
FIG. IV
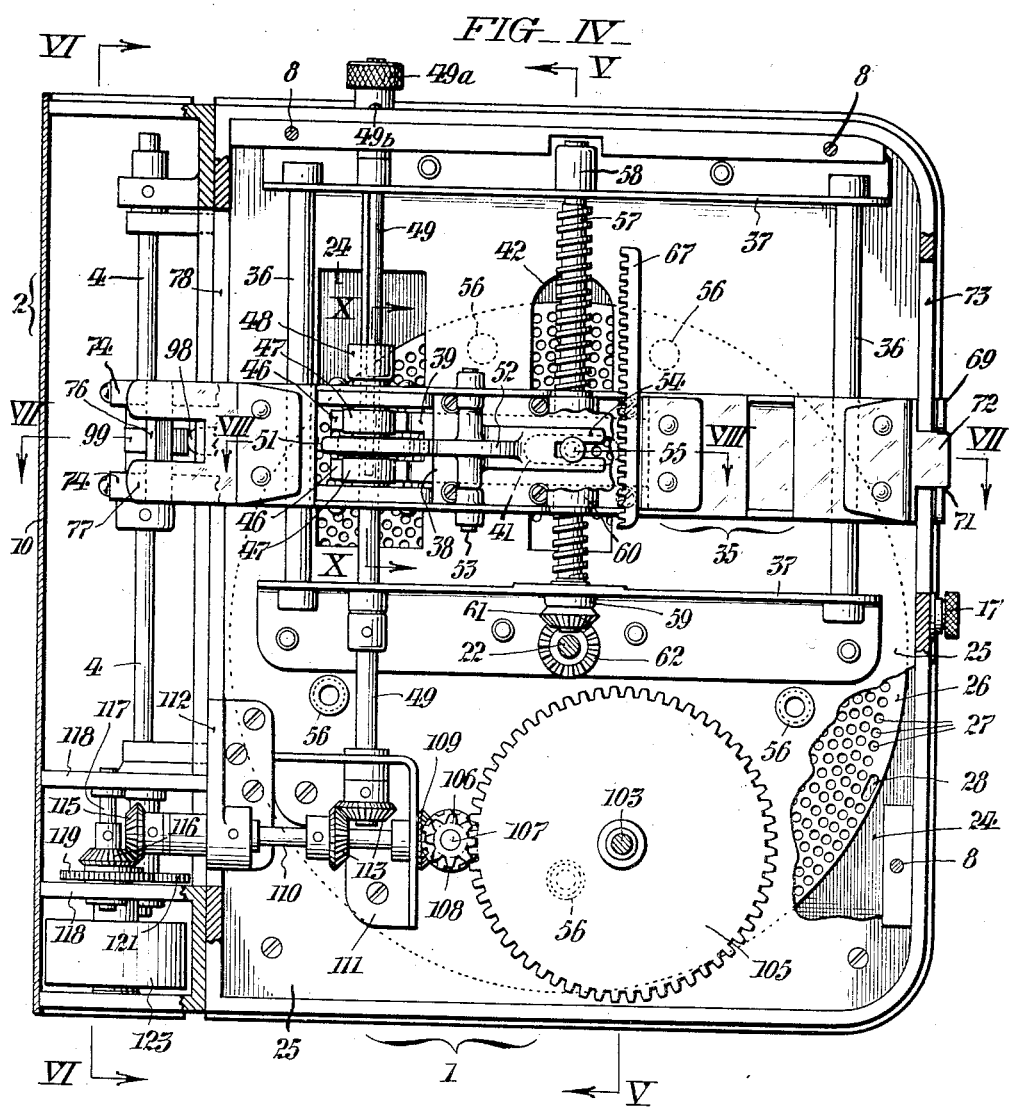
WITNESSES:
John C. Bergner
Hubert Fuchs
INVENTOR:
James J. Dilks, Jr.,
BY Fraley Paul
ATTORNEYS.

Dec. 21, 1937.　　　　J. J. DILKS, JR　　　　2,102,788
DISK FILM MOTION PICTURE
Filed Feb. 21, 1935　　　7 Sheets-Sheet 5
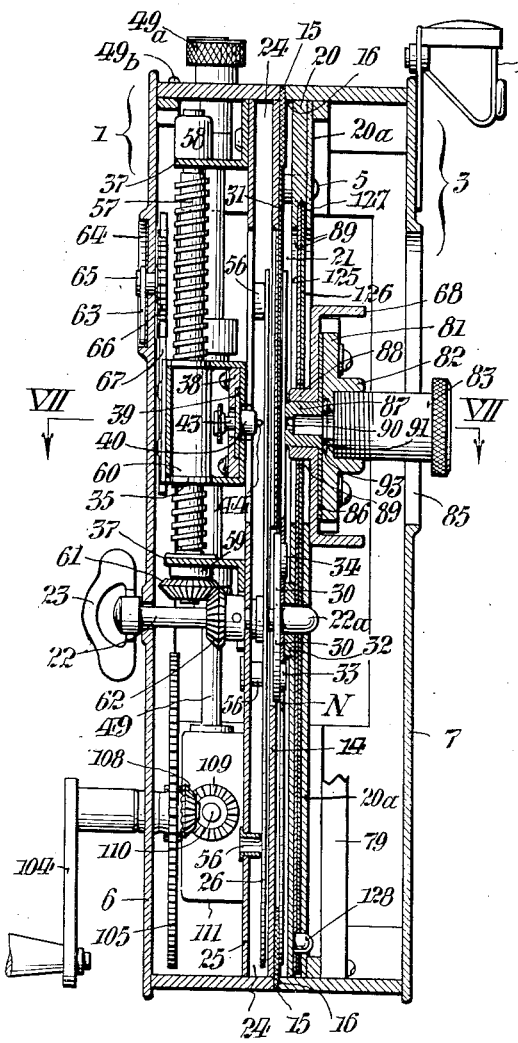
FIG. V.
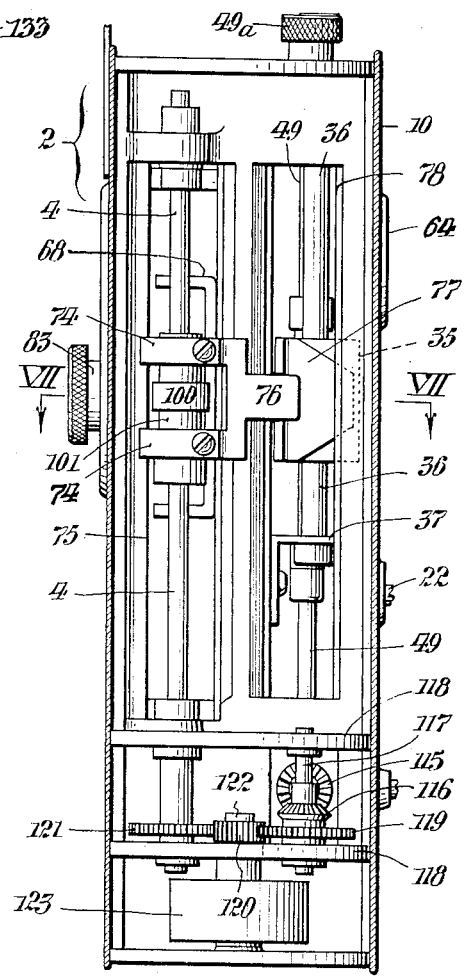
FIG. VI.
WITNESSES:
John C. Bergner
Hubert Fuchs
INVENTOR:
James J. Dilks, Jr.,
BY Fraley & Paul
ATTORNEYS.

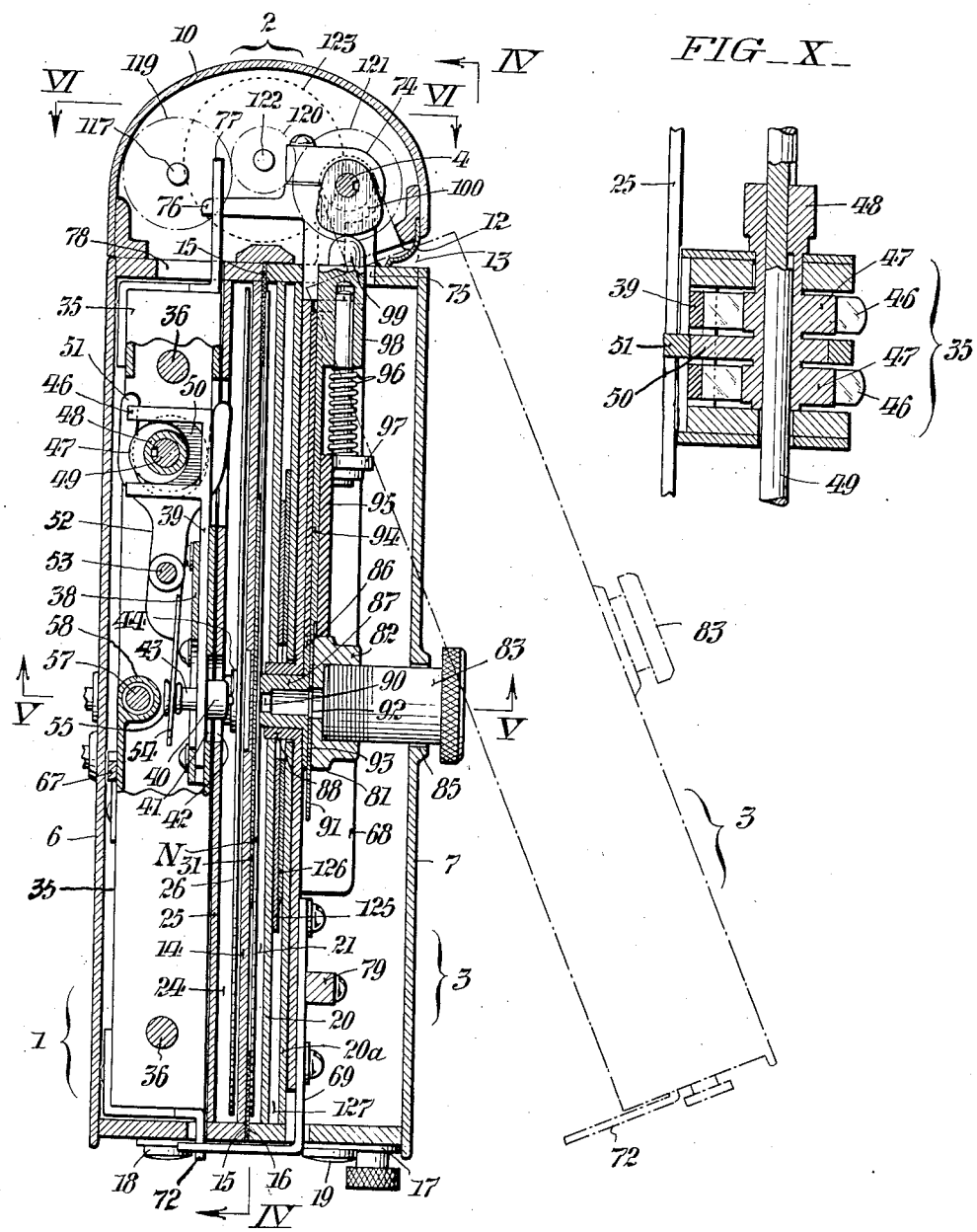

Dec. 21, 1937.　　　　J. J. DILKS, JR　　　　2,102,788
DISK FILM MOTION PICTURE
Filed Feb. 21, 1935　　　7 Sheets-Sheet 7
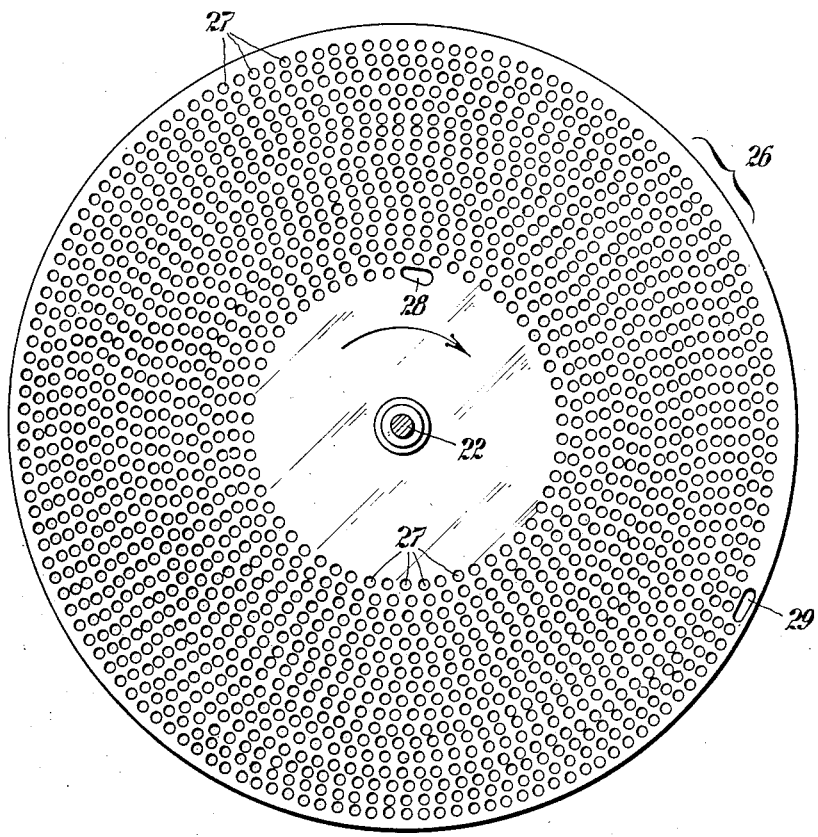
FIG. XI
INVENTOR:
James J. Dilks, Jr.

Patented Dec. 21, 1937

2,102,788

UNITED STATES PATENT OFFICE 2,102,788

DISK FILM MOTION PICTURE

James J. Dilks, Jr., Philadelphia, Pa.

Application February 21, 1935, Serial No. 7,560

26 Claims. (Cl. 88—18.3)

This invention relates to disk film motion pictures. More specifically, it has reference to methods of making motion picture disk film negatives, as well as to disk film motion picture apparatus, particularly cameras.

The practice heretofore followed in making disk film motion picture negatives was to intermittently rotate a film disk by uniform angular increments while moving the lens aperture of the camera radially of the disk. As a result, the exposures or pictures were arranged in a spiral on the disk surface and disposed in radial lines with the circumferential spacing varying, the spacing being greatest at the periphery of the disk and becoming less toward the inner end of the spiral. As a consequence, not only was a very considerable proportion of the film surface wasted, but a relatively large disk required for a motion picture exhibition of a substantial or worthwhile duration. This in turn entailed a correspondingly large and cumbersome camera necessary for the making of the negatives, as well as a correspondingly large and cumbersome apparatus for projecting positive film disks made from the negative disk. Moreover, with the prior art large film disks, difficulties were experienced through warping and shrinking of the films incident to developing and printing, the exposures or pictures being often out of radial alignment with each other as well as with holes or notches around the disk periphery by aid of which intermittent rotation of the film disk was effected.

Considered from the broadest aspect, my invention is directed toward overcoming the drawbacks which have been mentioned, that is to say: to enable making of motion picture film negatives in disk form from which can be printed, positive film disks such as featured in my copending patent application Serial No. 7,561 simultaneously filed herewith, wherein the exposures or pictures are arranged on the disk surface in uniformly spaced juxtaposed serial relation lengthwise of a spiral with the convolutions of the spiral in direct contiguity so that, except for a blank space left at the center for engagement by a driving element, the whole surface of the disk is covered with the exposures or pictures. This enables the use of a much smaller film disk for a given period of exhibition than heretofore, and obviates the difficulties due to warping and shrinking. It also permits the use of much smaller and less cumbersome apparatus than heretofore. These several advantages I attain through an improved method of negative disk making incident to which the disk negative and a lens aperture compensatively are moved intermittently such that small areas of the disk surface are successively presented to the lens aperture in circumferential steps of a width corresponding to the width of said lens aperture along a spiral swath whereof the pitch equals the height of said aperture.

A further object of my invention is to provide a simple, compact and reliable motion picture camera capable of producing negative film disks such as above described. As also more fully disclosed hereinafter, the camera by which this object is realized embodies a drive disk on an axis or shaft upon which the negative disk is mounted, said drive disk having holes spaced along a spiral whereof the pitch equals the height of the lens aperture of the camera by a distance equal to the length of the lens aperture; and a pawling element in line with the lens aperture having a throw equal to the width of said aperture, said element being adapted to successively pick the spirally-arranged holes in the disk in presenting small areas of the disk film surface successively to the lens aperture while the latter and the pawling element are compensatively shifted radially of the disk through movement derived from the aforesaid axis or shaft.

A further aim of my invention is to enable starting of the pictures at any desired point on the film disk through provision in disk film motion picture apparatus characterized as above, of means accessible at the exterior of the casing of the apparatus whereby the pawling element can be temporarily placed in retracted position out of engagement with the drive disk so that the latter may be continuously rotated by turning its axis or shaft to position said element and the lens aperture at any particular hole of the spiral series in the disk.

Another object of my invention is to provide at the exterior of the casing of the apparatus, means to visually indicate the position of the pawling element and the lens aperture relative to the drive disk and the negative film disk.

Still another object of my invention is to attain the foregoing advantages in a camera having the form of a book with hinge-connected hollow components affording between them a space to receive the negative film disk, and wherein the parts of the mechanism are distributed in the interiors of said components and coordinated at the hinge joint by loose coupling means which will permit opening and closing of the camera for insertion and removal of the film disks.

In a great many respects, my novel camera is similar to a projector featured in another patent application Serial No. 7,562, also simultaneously filed herewith and designed for the exhibition of positive film disks printed from negative disks made in accordance with the present invention. Accordingly certain of the claims appended hereto and directed generally to disk film motion picture apparatus cover those features which are common to the camera and projector.

Other objects and attendant advantages of this invention will be manifest from the following detailed description of the drawings, wherein Fig. I is a perspective view of a disk film motion picture apparatus in the form of a camera conveniently embodying my invention.

Fig. II is an elevation of the camera with the front component of its casing removed and with parts broken out and sectioned to expose important details.

Fig. III is an elevation with the cover of the front casing component removed, and with portions broken away and in section.

Fig. IV is a similar elevation with the cover plate of the back component of the camera casing removed, likewise with parts broken out and sectioned for exposure of important details.

Figs. V and VI are vertical sections of the camera taken respectively as indicated by the arrows V—V and VI—VI in Fig. VII.

Fig. VII is a horizontal sectional view of the camera taken as indicated by the arrows VII—VII in Figs. III, IV, V and VI.

Fig. VIII is a fragmentary detail sectional view taken as indicated by the arrows VIII—VIII in Fig. IV.

Fig. IX is a view corresponding to Fig. VIII with the movable parts in a different position.

Fig. X is a detail sectional view taken as indicated by the arrows X—X in Fig. IX; and Fig. XI shows in elevation, a perforated drive disk with the aid of which intermittent rotary movements are imparted to the disk film.

As herein delineated, my novel disk film motion picture camera comprises a casing in the form of a book with a hollow back component 1 to which is rigidly secured a hollow rounded end component 2, and a hollow front component 3 which is swingable to open position as shown in dot and dash lines in Fig. VII about a vertical shaft 4 within said end component as an axis. Dowel pins 5 projecting from the component 1 and engaging correspondingly allocated holes in the component 3 insure accurate alignment between said components. The back and front casing components 1 and 3 are closed by cover plates 6 and 7 respectively which are removably secured by screws 8 and 9 so that access may be had to the parts at the interiors of said sections when required. The end casing component 2 also has a removable cover piece 10 which is secured by screws 11 likewise for convenience of access to the parts within. A flexible metallic packing strip 12 fast in the end casing component 2 with its free edge bearing against the contiguous edge of the front component, serves as a closure for the hinge gap 13, see Figs. I, II and VII. On the inner wall 14 of the back casing component is a perimetric packing 15 of velvet or felt with which the inner edge 16 (Figs. V and VII) of the front component 3 engages to form a light-tight joint when the two camera components 1 and 3 are secured by a latch 17, which, as best shown in Fig. I, is pivoted at 18 to said back component and which engages a stud 19 on the swinging end of said front component. The inner wall 20 of the front casing component 3 is recessed somewhat as shown in Figs. V and VII with provision of a space 21 between said wall and the inner wall 14 of the back component 1 into which space a negative disk film N is placed in a manner hereinafter explained.

Journaled in bearing apertures substantially centrally of the inner wall 14 and the cover plate 6 of the back casing component 1 is a shaft 22 having a manipulating key 23 accessible at the back of the camera. Secured to the portion of the shaft 22 within a chamber 24 set apart in the casing section 1 by a partition 25, is a disk 26 of thin stiff material, preferably sheet metal, which, it will be observed from Figs. IV and XI, has a spiral series of circular holes 27. As shown, the holes 27 are equi-spaced along the length of the spiral which begins at a point close to the peripheral edge of the disk, and which extends well toward the center of said disk. The circumferential interval between the holes 27 of the disk and the pitch of the spiral are respectively equal to the width and height of the lens aperture, later referred to, of the camera. At the inner and outer terminals of the spiral series of holes 27, the disk 26 is provided with circumferentially elongate apertures 28 and 29 whereof the purpose will also be explained later. Set upon the shaft 22 somewhat forwardly of the perforate disk 26 (Figs. II and V) is a circular plate 30 whereof the frontal face lies in the same plane with a sector shaped pad 31 (Fig. II) of felt or the like on the inner wall 14 of the back casing component 1 above the plane of said shaft. The rounded head end 22a of the shaft 22 extends forwardly beyond the circular plate 30 and when the camera is closed, engages an apertured boss 32 on the inner wall 20 of the front casing section 3 as shown in Fig. V, said plate being provided with a pair of diametral studs 33 and 34 of different diameters. The film disk N is provided with a central opening to fit over the rounded end 22a of the shaft 22, and diametral openings to fit the studs 33 and 34 on the plate 30. The film disk N can thus be applied to the plate 30 only in one position with one face thereof resting at the top against the felt protective pad 31 on the inner wall of the back component 1 of the camera. From Figs. V and VII it is to be particularly observed that with the camera closed, a boss 32 on the inner wall 20 of the front casing component 3 bears centrally upon the disk film N to press it against the mounting plate 30 and thereby positively maintain it engaged with the driving studs 33 and 34.

Movable vertically up and down within the hollow of the back casing component between the cover plate 6 and the partition 25 (Figs. IV, V and VII) is a horizontally elongate carriage 35 of channel cross section. Adjacent its ends, this carriage 35 slidingly engages guide rods 36 whereof the upper and lower ends are secured respectively in spaced horizontal angle pieces 37 riveted or otherwise rigidly attached to the partition 25 above the level of the shaft 22. Confined to horizontal movement in a guideway 38 on the carriage 35 is a slide 39 having a lateral boss 40 projecting through registering horizontal and vertical slots 41 and 42 respectively in the vertical web of the carriage and the partition 25. Shiftable endwise in the boss 40 is a plunger 43 with a round-ended stud 44 projecting from its forward end, said stud being yieldingly urged outwardly by a spring 45 within the hollow of the plunger and adapted to serve as a pawl in picking the circular holes 27 in the metallic disk 26 and thereby intermittently rotating the latter and the film N incident to reciprocations of the slide 39. As shown in Figs. VII–IX, the slide 40 has a forked end with yoke extremities 46 to cooperate with spaced eccentric cams 47 on a sleeve 48 splined on a vertical shaft 49 which has bearing in the horizontal angle pieces 38 aforementioned. Also secured to the sleeve 48 centrally between the cams 47 is another eccentric cam 50 which operates within the forked end 51 of a lever 52 fulcrumed at 53 on the carriage 35 to vibrate said lever. The opposite end of the lever 52 is clevised as at 54 in Fig. IV to engage a circumferentially grooved head 55 of the plunger 43. Thus, during rotation of the shaft 49, the slide 39 is reciprocated to impart movements to the perforate disk 26 by the picker stud 44 to an extent corresponding exactly to the circumferential spacing of the spirally arranged holes 27 of said disk, the plunger 43 being retracted between picks for withdrawal of the picker stud from one hole and insertion into the next. During this action, the spring 45 permits yielding of the stud 44 as the latter passes over the blank spaces of the disk 26 intervening the holes 27. Lateral buttress projections 56 on the partition 25 bear against one side of the disk 26 to prevent it from whipping during rapid intermittent rotation thereof, see Figs. IV and V.

In order to shift the carriage 35 vertically so that the picker stud 44 is shifted radially of the shaft 22 and thus caused to follow the curvature of the spiral line of the holes 27 in the disk 26, there is provided a vertical screw spindle 57 which is rotative in bearings 58 and 59 respectively formed on the horizontal angle pieces 37, the spindle engaging a vertically threaded boss 60 of the carriage 35. Secured to the lower end of the screw spindle 57 beneath the bearing 59 is a miter pinion 61 which meshes with a companion miter pinion 62 on the shaft 22 so that the vertical movements of the carriage 35 are definitely coordinated with the intermittent rotational movements of the disk 26. The position of the picker stud 44 radially of the perforate disk 26 is indicated at the back of the camera through coordination of a pointer 63 (Fig. V) with a dial 64 on the cover plate 6. The shaft 65 of the pointer 63 extends through the cover plate 6, and to its inner end is secured a spur pinion 66 which meshes with a vertical driving rack bar 67 (Fig. IV) on the carriage 35. The gear ratio between the carriage and the spur gear is such that the pointer 63 makes a complete circuit of the dial as the carriage moves between the limits of its traverse.

As shown in Figs. I and IV, the cam shaft 49 extends up through the top of the back casing component 1 to the exterior where it is fitted with a manipulating knob 49a. When this knob 49a is turned so that the arrow thereon (Fig. I) points to a marker 49b on the top of the casing component 1, the picker stud 44 is placed in its retracted position out of engagement with the drive disk 26. The purpose of this provision is disclosed later herein.

Movable vertically up and down within the hollow of the front casing component 3 is a carriage 68. Attached to the right hand end of this carriage 68 is a tongue 69 which projects through a vertical slot 70 in the swinging end of the front casing component 3, and which, at the exterior, is bent laterally and notched as at 71 to engage a tongue 72 projecting outward through a vertical slot 73 in the contiguous end wall of the back component 1 from the corresponding end of the picker carriage 35. At the right hand end (Fig. III) the carriage 68 has a pair of vertically-spaced extensions 74 which project through a vertical slot 75 in the corresponding end of the casing component 3 into the hollow of the end casing section 2. From the extensions 74 of the carriage 68 projects laterally a tongue 76 which engages a centrally notched tongue 77 extending into the casing component 2 through a vertical slot 78 (Figs. IV, VI and VII) in the contiguous end wall of the casing component 1 from the corresponding end of the picker carriage 35. The two carriages 35 and 68 are loosely connected for movement in unison by end couplings which permit opening of the camera for insertion and withdrawal of the film disks without attendant dis-registry of the parts. A fixed vertical bar 79 spaced from the partition 20a (Fig. VII) within the hinged casing component 3 affords, jointly with said partition, a slideway for the left hand end (Fig. III) of the carriage, while the extensions 74 at the opposite end are guided by the shaft 4. The carriage 68 is thus effectively guided in its movements.

Secured by screws to the carriage 68 (Figs. III and V) at the center is a plate 81 with a threaded boss 82 into which is screwed a tubular holder 83 containing the photographic lens L of the camera. As shown in Figs. I and V, the tubular lens holder 83 projects through a vertical slot 85 in the cover plate 7 of the front casing component 3. Clamped between the plate 81 and the vertical web of the carriage 68, is a plate 86 with an inward hollow cylindric projection 87 engaged in a boss 88 at the back of said carriage. As shown in Figs. III and V, the partition 20 and a supplemental partition 20a attached thereto are vertically slotted as at 89 for passage of the boss 88 on the lens carriage 68. At its inner end, the projection 87 of the plate 86 has a square aperture 90 in the axis of the lens L and in the same horizontal plane with the picker stud 44, see Fig. V. With the camera closed, the end of the projection 87 bears on the film disk N, also as shown in Fig. V, so that the latter, during intermittent rotation thereof, is held snugly against the felt protective facing 31 on the inner wall 14 of the back component 1 of the camera.

The lens shutter of the camera has the form of a tongue 91 (Figs. III and V) fashioned from thin strip sheet metal with an aperture 92 at one end thereof, and adapted to slide horizontally back and forth on the carriage 68 within a slot provided by a transverse recess 93 in the back of the plate 81, see Fig. V. Referring to Figs. III and VII, the shutter tongue 91 is secured to a slide 94 which is confined to longitudinal movement by a guide 95 on the carriage 68. A helical spring 96 in compression between an abutment 97 on the guide 95 and an abutment 98 on the right hand end (Fig. III) of the shutter slide 94 serves to yieldingly hold a hemispherical end projection 99 on said slide in engagement with a rotary cam 100 on the shaft 4 hereinbefore mentioned. As shown, the tubular boss 101 of the cam 100 has a sliding spline connection 102 with the shaft 4, and is held from axial displacement between the spaced extensions 74 of the carriage 68.

The mechanism of the camera is actuated from a main shaft 103 (Fig. IV) which has journal support in bearing apertures in the cover 6 of the back casing section 1 and in the partition of said section. In the present instance the shaft 103 is arranged to be actuated by a hand crank 104 on the projecting end thereof, see Fig. V. If desired, a suitable spring or other motor may be placed within the hollow of the back casing section 1 to drive the shaft 104. By means of a pair of multiplying spur gears 105 and 106, motion is communicated at increased speed to a countershaft 107, from which motion is in turn transmitted, through a pair of miter gears 108, 109, to a horizontal shaft 110 journaled in fixed bracket bearings 111 and 112, within the hollow of the back casing section. As shown in Fig. IV, the vertical cam shaft 49 receives motion through another miter gear couple 113 from the horizontal shaft 110 which extends into the hollow of the end casing component 2 where it is fitted with a miter pinion 115 that meshes with a companion miter pinion 116 on a vertical arbor 117 having its ends journaled in spaced horizontal diaphragms or partitions 118 within said end casing component. Also secured to the arbor 117 is a spur gear 119, (Figs. IV, VI and VII) which, through an idler 120, drives a similar spur gear 121 on the cam shaft 4 from which the lens shutter 91 within the front casing section 3 is actuated. At its lower end, the shaft 122 of the idler is fitted with a weighted balance wheel 123 by which the movement of the parts is stabilized. By virtue of the drive system just described, the lens shutter 91 will obviously be actuated in proper timed relation to the picker 44 through the medium of which the film disk N is intermittently rotated, the lens shutter opening during the quiescent periods of said film disk.

Ingress of light through the vertical slots 85 and 89 respectively in the cover plate 7 of the front casing section 3 and its front wall 20 and the attached partition 20a, is prevented by a pair of eclipsing sectoral shutter vanes 125 and 126, see Figs. III and V, which are fashioned from thin sheet metal. These shutter vanes 125 and 126 lie within a shallow triangular hollow 127 between the wall 20 and the partition 20a of the casing section 3 and are fulcrumed at their lower ends to swing about a fixed stud 128. The boss 88 on the lens carriage 68 engages oppositely sloping diagonal cam slots 129 and 130 respectively in the vanes 125 and 126 so that the latter are moved toward each other as the carriage 68 descends and vice versa. Incident to this movement of the vanes 125 and 126, their solid portions continuously obstruct the vertical slots 89 of the wall 20 and partition 20a above as well as below the boss 88, in which function they are assisted by the lens carriage 68 itself which moves in front of them as will be apparent from Figs. III and V. The shutter vanes 125 and 126 are also provided respectively with arcuate slots 131 and 132 to clear the rounded end 22a of the shaft 22 carrying the perforate disk 26.

To assist in locating the subject which is to be photographed the camera is fitted with a finder 133. This finder may be of any preferred conventional type, and, as shown is mounted at the top of the front component 3 of the camera casing.

The manner in which the camera is to be used is as follows. The knob 49a at the top of the shaft 49 is turned to bring its arrow point opposite the marker 49b whereby the picker stud 44 is placed in retracted position out of engagement with the drive disk 26. The drive disk 26 is thereupon continuously rotated in the proper direction by means of the finger key 23 on its shaft 22 until the elongate terminal aperture 28 arrives at the picker stud 44 which position will be shown on the dial 64 by the pointer 63. The camera is thereupon opened and the negative film disk N impaled on the rounded end 22a of the shaft 22 with its diametral apertures engaging the laterally-projecting impelling studs 33 and 34 of the mounting plate 30, whereupon the camera is closed and secured by the latch 17. The mechanism is then set into motion by turning the crank handle 104 and the shaft 22 given a slight shift in the direction indicated by the arrow in Fig. II by means of the finger key 23 to initiate picking of the circular holes 27 in the drive disk 26. From then on, the disk 26 and the mounted film disk 10 are intermittently rotated in the same direction by the action of the picker stud 44, while said picker stud and the lens aperture 90 are compensatively moved radially of the film disk N toward the periphery of the latter, the lens shutter 91 being actuated during the quiescent periods to uncover the lens L. As a result a series of pictures P is taken along a spiral swath of gradually increasing radius as shown in Fig. II, the pictures, by reason of the spacing of the holes 27 in the drive disk 26, being directly contiguous in both directions without any spaces between them and respectively in line with the holes in the drive disk. The photographing may be terminated at any point on the film disk N by aid of the pointer 63 and dial 64, or the operation may be continued until the available surface of the film disk is completely covered with pictures, by which time the elongate aperture 28 in the drive disk 26 arrives at the picker stud 44 whereupon further movement of the film ceases with the stud moving idly back and forth in said aperture. The film disk N is thereupon removed from the camera and laid aside for developing. The picture taking may be started in a similar way at the periphery of the film disk and the hand crank 104 rotated in the opposite direction to determine a series of pictures in a spiral of gradually diminishing radius.

Through my invention, it is possible to photograph on a negative disk approximately six inches in diameter as many as nineteen hundred and some odd pictures, giving positives made from the negative an exhibition period of about two minutes. The film disks for my improved camera are thus inexpensive in comparison with the prior art large disks of a corresponding exhibition period which had a diameter of ten inches or more. The smallness of the disks moreover makes possible a simple, compact and reliable camera of correspondingly small dimensions and of light weight which can be readily carried about and easily manipulated.

Having thus described my invention, I claim:
1. A disk film motion picture camera comprising two hollow hinge-connected front and back casing components jointly affording between them a space to receive a negative film disk; a rotative axis with a mounting for the film on the back component; a drive disk secured to said axis within the hollow of the back component, said disk having holes spaced by an interval corresponding to the width of the lens aperture along a spiral of which the pitch equals the height of said lens aperture; a pawling element in line with the lens aperture adapted to successively engage the holes of the disk in the back casing component; means in the front casing component for moving the lens aperture radially of the negative film disk; and mechanism within the hollows of the two casing components with parts coordinated through the hinge connection between said components for actuating the pawling element and the lens aperture moving means to intermittently rotate the drive disk and shift the lens aperture compensatively, and for opening the lens shutter during the stationary periods of the disk.

2. A disk film motion picture camera in accordance with claim 1, wherein the lens aperture moving means is in the form of a screw spindle driven from the axis of the perforate disk.

3. A disk film motion picture camera with hollow hinge-connected front and back casing components jointly affording between them, a space to receive a negative disk film; a rotatable axis mounting for the disk negative in the back casing component; a carriage in the front casing component supporting a lens shutter, and a lens aperture for movement radially of the disk negative; a drive disk on the mounting axis for the disk negative within the back casing component, said drive disk having holes spaced by an interval corresponding to the width of the lens aperture along a spiral of which the pitch equals the height of said aperture; a carriage within the back component guided for movement radially of the disk and loosely coupled with the carriage in the front component to permit opening of the camera for insertion and withdrawal of the negative disk film; a pawling element on the last-mentioned carriage in line with the lens aperture and having a throw corresponding to the width of said aperture, adapted to successively pick the holes in the drive disk; and mechanism for actuating the picker element to intermittently rotate the drive disk and for concurrently shifting the carriages compensatively as well as for opening the lens shutter during the stationary periods of the disk film.

4. A disk film motion picture camera in accordance with claim 3, wherein a tubular holder for the lens on the lens aperture carriage projects through a slot in the front casing component; and wherein a pair of eclipsing interpivoted shutter vanes within the front casing component are provided with oppositely inclined cam slots for coaction by the lens holder and actuated incident to movement of the carriage to prevent entry of light through the slot in the front casing component.

5. A disk film motion picture camera in accordance with claim 3, wherein a lens holder projects to the exterior through a slot in the front casing component; and wherein a shutter means actuated through movement derived from the carriage in the front casing component serves to continuously obstruct the slot aforesaid against the entry of light.

6. A disk film motion picture camera in accordance with claim 3, wherein a lens holder on the lens aperture carriage projects to the exterior through a slot in the front casing component; and wherein a pair of interpivoted eclipsing shutter vanes within the front casing component are actuated through movement derived from the carriage to continuously obstruct the slot aforesaid against entry of light.

7. A disk film motion picture camera in accordance with claim 3, wherein the pawling element is in the form of a picker stud guided for axial movement in a reciprocating slide on the carriage within the back casing component; wherein a rotary cam on a shaft within the back casing component actuates a lever on the carriage whereby the picker stud is withdrawn from one hole in the drive disk and inserted into the next during idle shifts of the slide; wherein the shaft has a knob with an indicator accessible at the exterior of the back casing component whereby it may be positioned with the picker stud withdrawn from engagement from the drive disk so that the latter may be continuously rotated by a finger key on its axis exteriorly of the casing to position the carriage for starting of the drive disk at any selected hole and wherein an indicator at the back of the camera is automatically actuated by movement of the carriage to indicate the starting position of the picker stud radially of the drive disk.

8. A disk film motion picture camera in accordance with claim 3, wherein the pawling element is in the form of a picker stud guided for axial movement in a reciprocating slide on the carriage within the back casing component; wherein a rotary cam on a shaft within the back casing component actuates a lever on the carriage whereby the picker stud is withdrawn from one hole in the drive disk and inserted into the next during idle shifts of the slide; wherein the shaft has a knob with an indicator accessible at the exterior of the back casing component whereby it may be positioned with the picker stud withdrawn from engagement from the drive disk so that the latter may be continuously rotated by a finger key on its axis exteriorly of the casing to position the carriage for starting of the drive disk at any selected hole and wherein a pointer actuated by motion of the carriage indicates on a dial at the back of the camera, the starting position of the picker stud radially of the drive disk.

9. A disk film motion picture apparatus comprising a lens; a movably-mounted lens carriage; a shaft with a mounting for the disk film; a drive disk on the shaft having holes arranged in a spiral; means for imparting intermittent rotative shifts to the drive disk including a picker on the carriage to successively engage the holes of said drive disk; means for reciprocating the picker circumferentially of the drive disk, and separate means for holding the picker withdrawn from the disk during movements thereof in one direction; and positive drive means interconnecting the shaft and the carriage for transmitting motion from said shaft to said carriage whereby the lens and the picker are intermittently shifted radially of the film disk concurrently with the rotative shifts of the latter.

10. A disk film motion picture apparatus comprising a lens; a shaft with a mounting for the disk film; a carriage guided for movement radially of the disk film and supporting the lens; a drive disk on the shaft having holes arranged in a spiral; means for imparting intermittent rotative shifts to the drive disk including a picker on the carriage adapted to successively engage the holes of the drive disk, and a pair of rotary cams, one for reciprocating the picker circumferentially of the drive disk and the other to withdraw the picker away from the drive disk and so hold it during its movements in one direction; and positive drive means interconnecting the shaft and the carriage for transmitting motion from said shaft to said carriage whereby the lens and the picker are intermittently shifted radially of the disk film concurrently with the rotative shift of the latter.

11. A disk film motion picture apparatus according to claim 9, wherein the carriage shifting means is in the form of a screw spindle geared with the shaft and having threaded engagement with the carriage.

12. A disk film motion picture apparatus comprising a lens; a shaft with a mounting for the disk film; a carriage guided for movement radially of the disk film; a drive disk on the shaft having holes arranged in a spiral; means for imparting intermittent rotative shifts to the drive disk including a picker on the carriage adapted to successively engage the holes of the drive disk, and a pair of rotary cams, one to reciprocate the picker tangentially of the drive disk, and the other to withdraw the picker away from the disk and so holding it during its movements in one direction; means for compensatively shifting the carriage radially concurrently with the rotative shifts of the disk film; a casing to house the movable parts of the apparatus; an actuating finger knob operatively connected to the picker mechanism and an indicator at the exterior of the casing whereby the picker may be placed in a neutral position temporarily; and means accessible exteriorly of the casing and connected to the shaft aforesaid whereby the disk may be rotated for starting of the picking at any selected hole.

13. A disk film motion picture camera with hollow hinge-connected front and back casing components jointly affording between them, a space to receive a negative disk film; a rotatable axis mounting for the disk negative in the back of the casing component; a carriage in the front casing component supporting a lens shutter and a lens aperture for movement radially of the disk negative; a drive disk on the mounting axis for the disk negative within the back casing component, said drive disk having holes spaced by an interval corresponding to the width of the lens aperture along a spiral of which the pitch equals the height of said aperture; a carriage within the back component guided for movement radially of the disk and loosely coupled with the carriage in the front component to permit opening of the camera; a reciprocating picker on the last mentioned carriage in line with the lens aperture having a fixed throw corresponding to the width of said aperture and adapted to successively pick the holes in the drive disk; means for actuating the picker including a slide on the carriage within the back casing component, a rotary cam on a shaft within the back casing component, a lever actuated by the rotary cam whereby the picker is withdrawn from one hole in the drive disk and inserted into the next during idle shifts of the slide; a knob on the rotary cam shaft to coordinate with an indicator at the exterior of the back casing component whereby the picker may be withdrawn temporarily from engagement with the drive disk; a finger key on the disk axis exteriorly of the casing, whereby, upon withdrawal of the picker as aforesaid, the carriage may be re-positioned for starting of the picking at any selected hole; and mechanism for compensatively shifting the two carriages concurrently with the rotative shifts of the disk film as well as for opening the lens shutter during the stationary periods of said film.

14. A disk film motion picture apparatus according to claim 9, wherein the mounting for the disk film is in the form of a plate with an axial stud to engage a central hole in the disk film, and with eccentrically disposed propelling studs of different diameters adapted to engage correspondingly-allocated holes in said film.

15. In film disk motion picture apparatus, a shaft with a mounting for a disk film; a drive disk on said shaft having a series of holes equally spaced along the spiral; mechanism for intermittently rotating the shaft including a picker pin, a movable support for the picker pin, means operative at each actuation while the pin is at rest to thrust it axially into a hole of the drive disk and to subsequently withdraw it from such hole, and means operative while the pin is in engagement with the disk to move said pin laterally to an extent corresponding to the spacing of the holes; and means positively interconnecting the shaft and the support for transmitting motion from said shaft to said support whereby the picker is shifted radially of the drive disk concurrently and compensatively with the rotative shifts of the latter to follow the spiral of the holes.

16. In disk film motion picture apparatus, a lens; a shaft with a mounting for a disk film; a drive disk on said shaft having a series of holes equi-spaced along a spiral; mechanism for intermittently rotating the shaft including a picker pin, a movable support for the lens and the picker pin, means operative at each actuation while the pin is at rest to thrust it axially into a hole of the drive disk and to subsequently withdraw it axially from such hole, and means operative while the pin is in engagement with the disk to move it laterally to an extent corresponding to the spacing of the holes; and means positively interconnecting the shaft and the support for transmitting motion from said shaft to said support whereby the lens and the picker are shifted radially of the film and the drive disk concurrently and compensatively with the rotative shifts of the latter to follow the spiral of the holes with the lens coming to rest in line with the hole last engaged by the picker.

17. A disk film motion picture apparatus according to claim 16 including means for obscuring the lens during shifting of the support.

18. A disk film motion picture apparatus comprising a lens; a shaft with a mounting for a disk film; a drive disk on the shaft; means for imparting intermittent rotative shifts to the drive disk; a movably-mounted support for the lens and the shifting means; positive drive means interconnecting the shaft and the support for transmitting motion from the shaft to the support whereby the latter is concurrently and compensatively shifted radially of the film disk; a casing housing the moving parts of the apparatus; means operatively connected to the picker and accessible from the exterior of the casing whereby the picker can be temporarily moved to neutral position; and means connected to the shaft exteriorly of the casing whereby said shaft may be continuously rotated thereafter to position the drive disk for starting at any selected hole thereof.

19. A disk film motion picture apparatus comprising a lens; a shaft with a mounting for a disk film; a drive disk on the shaft having holes arranged in spiral; a picker adapted to successively engage the holes of the drive disk in imparting intermittent rotative shifts to the latter; a movably mounted support for the lens and the picker; positive drive means interconnecting the shaft and the lens for transmitting motion from the shaft to the support whereby the latter and the picker are concurrently and compensatively shifted radially of the film disk; actuating means for the picker; a casing housing the moving parts of the apparatus; means accessible from the exterior of the casing and connected to the picker actuating means whereby the picker may be withdrawn temporarily out of engagement with the driving disk; means also accessible at the exterior of the casing and connected to the shaft whereby the shaft aforesaid may be continuously rotated subsequently for starting of the picking at any selected hole in the disk; and means likewise at the exterior of the casing and operatively connected to the support to indicate the position of the picker radially in respect to the disk.

20. A disk film motion picture apparatus comprising a lens; a shaft with a mounting for the disk film; a drive disk on the shaft; progressing means adapted to impart intermittent rotative shifts to the drive disk; a movably-mounted carriage for the lens and the progressing means; and positive drive means interconnecting the shaft and the carriage for transmitting motion from the shaft to the carriage whereby the lens and the progressing means are intermittently shifted radially of the disk film concurrently with the rotative shifts of the latter.

21. A disk film motion picture apparatus according to claim 18 wherein the drive means is in the form of a screw spindle geared with the shaft and having threaded engagement with the carriage.

22. A disk film motion picture apparatus comprising a lens; a shaft with a mounting for the disk film; a drive disk on the shaft having holes arranged in a spiral; a picker adapted to successively engage the holes in the drive disk to impart intermittent rotative shifts to the latter; a movably-mounted carriage supporting the lens and the picker; and positive drive means interconnecting the shaft and the carriage for transmitting motion from the shaft to the carriage whereby the lens and the picker are intermittently shifted radially of the disk film concurrently with the intermittent rotative shifts of the latter.

23. A disk film motion picture apparatus comprising a lens; a shaft with a mounting for the disk film; a drive disk on the shaft having equally spaced holes arranged in a spiral; a picker with a fixed throw adapted to successively engage the holes in the drive disk to impart intermittent rotative shifts to the latter; a movably-mounted carriage supporting the lens and the picker; and positive drive means interconnecting the shaft and the carriage for transmitting motion from the shaft to the carriage whereby the lens and the picker are intermittently shifted radially of the disk film concurrently with the rotative shifts of the latter.

24. A disk film motion picture apparatus comprising a lens; a shaft with a mounting for the disk film; a drive disk on the shaft having holes arranged in a spiral; a picker aligned with lens and adapted to sucessively engage the holes of the drive disk in imparting intermittent rotative shifts to the latter; a movably-mounted carriage for the lens and the picker; and positive drive means interconnecting the shaft and the carriage for transmitting motion from the shaft to the carriage whereby the lens and the picker are intermittently shifted radially of the disk film concurrently with rotative shifting of the latter.

25. A disk motion picture apparatus according to claim 9, wherein the picker is in the form of a pin confined to axial movement and yieldingly urged toward the disk by a backing spring.

26. A disk motion picture apparatus according to claim 9, including a lens shutter on the carriage, means for actuating the shutter in timed relation to the picker, and wherein the lens, the picker and the shutter are all aligned on the carriage.

JAMES J. DILKS, Jr.